Figure 1:
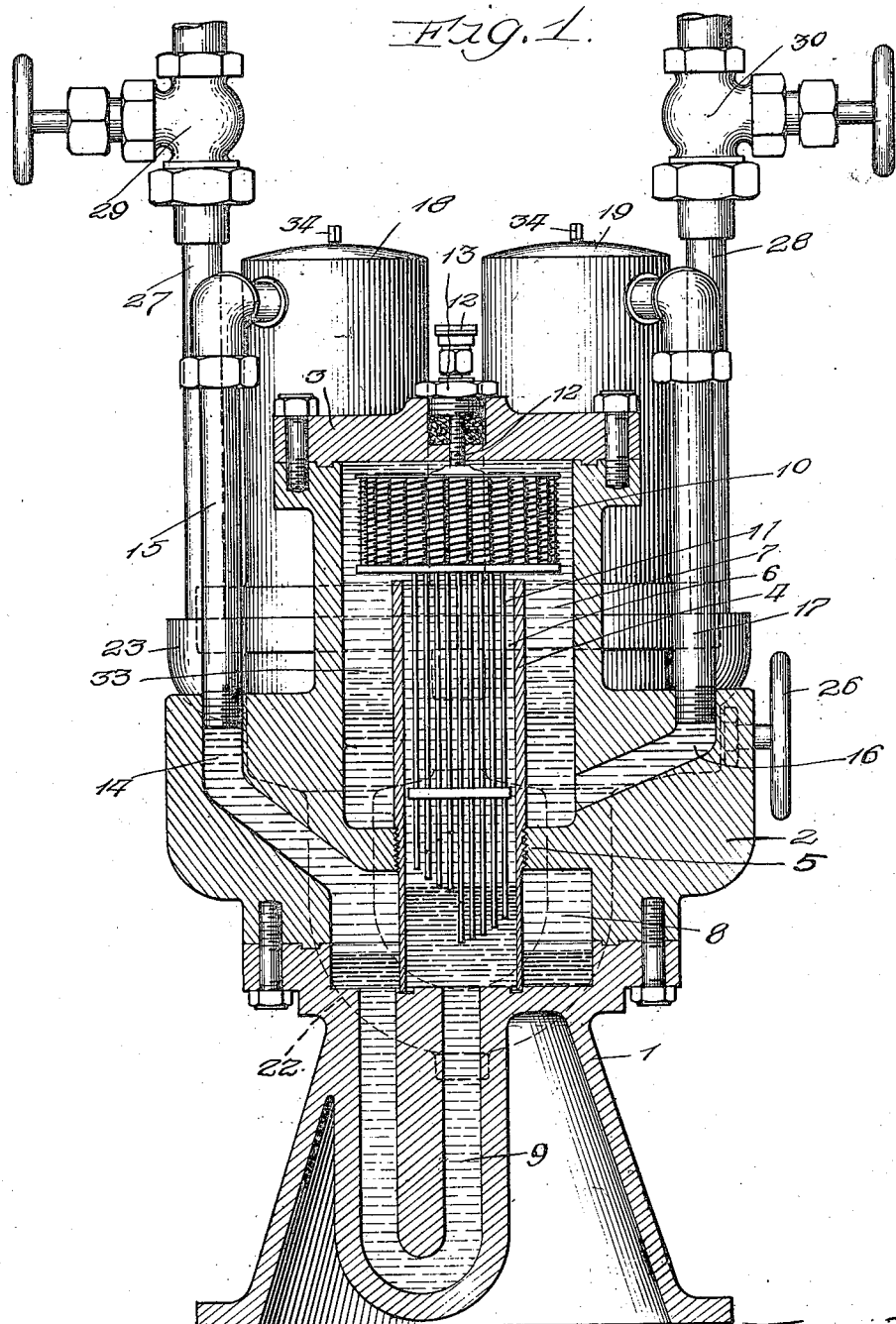

J. M. SPITZGLASS.
FLOW METER.
APPLICATION FILED OCT 25, 1917.

1,390,394. Patented Sept. 13, 1921.
2 SHEETS—SHEET 1.

Witness:
R. L. Farrington

Inventor,
Jacob M. Spitzglass.
By Brown & Nissen
Attys.

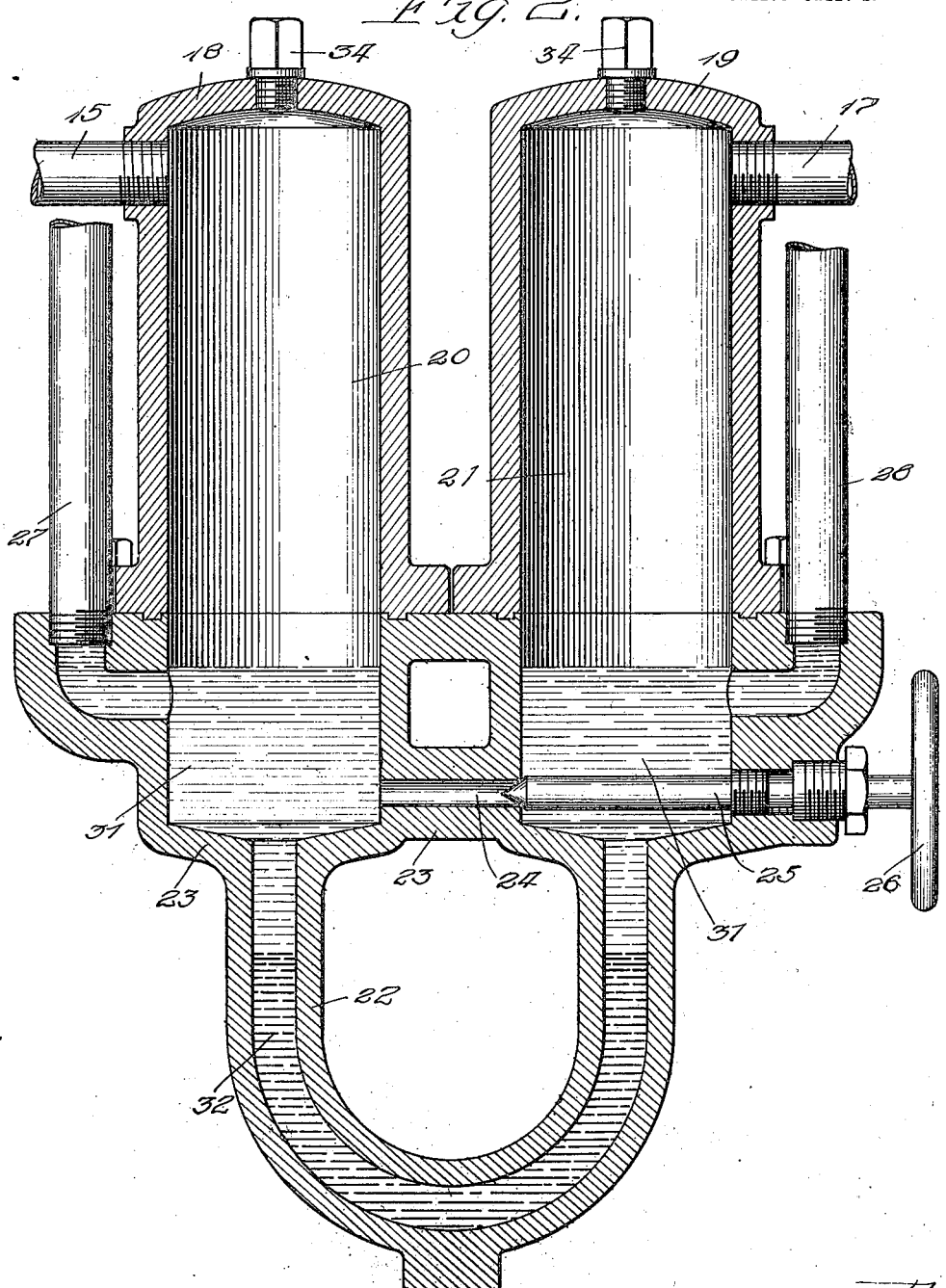

UNITED STATES PATENT OFFICE.

JACOB M. SPITZGLASS, OF CHICAGO, ILLINOIS, ASSIGNOR TO REPUBLIC FLOW METERS COMPANY, OF CHICAGO, ILLINOIS, A CORPORATION OF ILLINOIS.

FLOW-METER.

1,390,394.      Specification of Letters Patent.      Patented Sept. 13, 1921.

Application filed October 25, 1917. Serial No. 198,432.

*To all whom it may concern:*

Be it known that I, JACOB M. SPITZGLASS, a citizen of the United States, residing at Chicago, in the county of Cook and State of Illinois, have invented certain new and useful Improvements in Flow-Meters, of which the following is a specification.

This invention relates to meters for indicating and recording the flow of fluid and the principal object of the invention is to improve the structure of such apparatus so that the dangers incident to a surge in the differential pressure may be overcome, to provide a safety-seal, and by it to automatically restore the seal for the meter if a high differential pressure breaks it; and to provide means to more readily set the parts for zero reading.

The invention consists in the novel construction, combination and arrangement of the parts.

In the accompanying drawings—

Figure 1 is a sectional view of a flow meter provided with a safety seal in accordance with the principles of the invention, and Fig. 2 is a sectional view of the safety-seal.

In the present invention the flow meter proper is connected in parallel with a safety-seal which has a U-tube less in height than the U-tube of the meter proper so that a sudden surge of differential pressure communicated to the meter and its safety-seal will break only the safety-seal, equalizing the pressure therein and thereupon equalizing the pressures applied to the meter proper so that no damage will result to it. As soon as the abnormal differential pressure is released the mercury of the safety-seal collects in its U-tube and reëstablishes the necessary seal between the two compartments of the safety-seal.

The meter proper comprises a base 1 and a central member 2 provided with a cap 3 and a shell 4 threaded through a partition 5, and forming a central well 6 in the shell 4, a chamber 7 surrounding and above the upper end of the shell, and a chamber 8 surrounding the lower end of the shell 4 below the partition 5 which is connected to the lower end of the well 6 formed by the shell 4, by means of a U-tube 9 formed in the base member 1.

Disposed in the chamber 7, above the shell 4, is a plurality of resistance spools 10 connected in series with contact wires 11 depending therefrom into the well 6 formed by the shell 4, the contact wires terminating at successively different heights in the well 6 and dividing the resistance in proportion to the heights of the ends of the wires. A quantity of mercury, or other electricity-conducting liquid, is placed in the U-tube 9 and forms a part of the circuit which includes the resistance, the other terminal being a threaded post 12 which is adjustable through a packing nut 13 and is connected to the spools 10 for bodily raising and lowering them together with the contact wires 11 for adjusting the latter with respect to the mercury for setting the zero point of the meter.

Connected to the chamber 8 which is the dynamic chamber of the meter is a passage 14 to which pipe 15 is connected, and leading from the upper chamber 7, which is the static chamber, is a passage 16 to which pipe 17 is connected. These pipes 15 and 17 are connected to the upper ends of cylinders 18 and 19 respectively, and these cylinders comprise chambers 20 and 21 which are joined at their lower ends by a U-tube 22 in a member 23. Extending between the chambers 20 and 21, at their lower ends, is an equalizing passage 24 which is normally closed by a valve 25 which extends through the outer wall of the member 23 opposite the passage 24 and is provided with a hand wheel 26 for operating it. Also connected with the lower ends of the chambers 20 and 21, through the member 23, are dynamic and static pipes 27 and 28 which are connected to a suitable source of differential pressure supply, as for example a Pitot tube (not shown) through valves 29 and 30.

It will be observed in Fig. 1 that the U-tube 9 of the meter proper is somewhat longer than the U-tube 22 of the safety-seal, and it will be evident that if they are both filled with the same pressure translating medium, as for example mercury, it will require less differential pressure to blow the mercury out of the U-tube 22 of the safety-seal than out of the other tube 9, and as this safety-seal U-tube 22 is connected to chambers 20 and 21, the same as the static and dynamic chambers of the meter proper, it is obvious that the breaking of the seal formed by the U-tube 22 will equalize the pressures in the chambers 20 and 21 which will likewise equalize the pressures applied to the static and dynamic chambers 7 and 8 of the meter so that no harm will be done to the meter.

In operation if the meter is applied to measure the flow of a condensable fluid, such for example as steam, the water of condensation 31 accumulates at the bottoms of both of the chambers 20 and 21 of the safety-seal on top of the mercury 32 in the U-tube 22. The U-tube 9 is also filled with mercury to the level of the lowermost contact wire in the well 6 and the spaces in the static and dynamic chambers 7 and 8, the well 6, the passages 14 and 16, the pipes 15 and 17 and the chambers 20 and 21 on top of the condensed liquid 31 in the bottom of these chambers are all filled with a suitable insulating oil 33 which covers the contact wires 11 and the resistance spools 10 so that no conducting liquid except the mercury at the bottom of the well 6 can come in contact with the extremities of the contact rods 11, or with any other part of the conducting wires of the electric circuit. The resistance wound on the spools 10 is so divided by the depending contact wires that the flow of current in the circuit with a constantly impressed electromotive force is directly proportional to the flow of the fluid which is to be measured and of which the differential pressure is communicated to the meter. The tops of the cylinders 18 and 19 are provided with removable plugs 34 by means of which additional liquid can be added to either of the cylinders.

It will be seen therefore that the safety-seal is in the nature of a self-setting blow out which protects the meter proper and prevents the application of a dangerous differential pressure to the meter proper. The action of the meter depends only upon the level of the confined body of mercury in the U-tube 9 and the slightest change in the flow of the fluid, which is to be measured, will make an immediate change in the level of this mercury column, resulting in a corresponding immediate change of the amount of current passing through the resistance, and therefore in the reading of the meter. The insulating liquid is trapped around the contact wires and the resistance spools, preventing water and foreign substance from reaching or affecting the resistance.

I claim:

1. A safety-seal for a differential flow meter comprising a pair of cylinders connected at the bottom by a U-tube, connections at the bottoms of the cylinders for applying differential pressure, and tubular means extending from the tops of the cylinders for applying differential pressure to a flow meter.

2. A safety-seal for a flow meter comprising a pair of cylinders connected at the bottom with a U-tube, a valved equalizing passage between the cylinders adjacent the bottoms thereof, connections with the cylinders adjacent the bottoms thereof for applying differential pressure, and connecting means for applying the said differential pressure from the tops of the cylinders.

3. In an electric flow meter, the combination with a resistance having a plurality of contact wires depending therefrom and terminating at successively different heights, of means for confining a conducting liquid adjacent the bottoms of said wires and applying differential pressure thereto to raise and lower the liquid, and a device including a threaded plug having a lead wire for said resistance carried thereby for adjustably supporting the resistance and contact wires to vary the position of the wires with respect to the liquid.

4. In a fluid flow meter, the combination with means forming a static chamber and a dynamic chamber, and a connecting U-tube; of a safety-seal therefor comprising two cylinders connected at their bottoms by a U-tube, means connecting the seal and said chambers to receive the same differential pressure in parrallel, a seal of mercury for each of said U-tubes, and a body of lighter liquid entrapped in the chambers and in the cylinders of said seal which is maintained in the said chambers even though the safety-seal is broken.

5. In a fluid flow meter, the combination with means forming separate static and dynamic chambers connected by a U-tube, of a safety-seal connected in parallel therewith and comprising a pair of cylinders connected by a U-tube, a seal of mercury in each of said U-tubes, a lighter liquid filling the remainder of said chambers, a portion of said cylinders and the connecting means between the chambers and cylinders, and means at the top of each of said cylinders for adding additional liquid to them separately.

6. The combination of a fluid flow meter including a U-tube for receiving differential pressure, and a safety-seal including a U-tube connected thereto in parallel to receive the same differential pressure, said safety-seal including cylinders connected by a U-tube for automatically permitting the equalizing of pressure in both cylinders under less pressure difference than that applied to the flow meter U-tube, and a valved passage between the cylinders for equalizing the pressure therein at will.

7. In an electric fluid flow meter, the combination with means forming a pair of chambers connected by a U-tube, of a safety-seal therefor comprising a pair of cylinders joined by a U-tube and connected to the chambers in parallel from the tops of said cylinders, a variable resistance in one of said chambers, a conducting liquid in the U-tube connecting said chambers actuated by differential pressure to vary said resistance, a sealing liquid for the other U-tube, and a lighter insulating liquid filling the chambers and the upper portion of the cylinders which protects the resistance and transmits differential pressure to the ends of the conducting liquid.

In testimony whereof I have signed my name to this specification, on this 23rd day of October, A. D. 1917.

JACOB M. SPITZGLASS.